(12) United States Patent
Han

(10) Patent No.: US 11,383,857 B2
(45) Date of Patent: Jul. 12, 2022

(54) METHOD, DEVICE AND SYSTEM FOR GUIDING UNMANNED AERIAL VEHICLE TO LAND

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Song Han, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 207 days.

(21) Appl. No.: 16/323,137

(22) PCT Filed: Jul. 5, 2017

(86) PCT No.: PCT/CN2017/091781
§ 371 (c)(1),
(2) Date: Feb. 4, 2019

(87) PCT Pub. No.: WO2018/024069
PCT Pub. Date: Feb. 8, 2018

(65) Prior Publication Data
US 2019/0168889 A1   Jun. 6, 2019

(30) Foreign Application Priority Data

Aug. 4, 2016 (CN) .......................... 201610632597.0

(51) Int. Cl.
*B64F 1/18* (2006.01)
*B64D 45/08* (2006.01)
(Continued)

(52) U.S. Cl.
CPC .............. *B64F 1/18* (2013.01); *B64C 39/024* (2013.01); *B64D 45/08* (2013.01); *B64D 47/08* (2013.01);
(Continued)

(58) Field of Classification Search
CPC ...... B64F 1/18; B64F 1/00; B64F 1/36; B64F 1/20; B64F 1/007; G06Q 10/08;
(Continued)

(56) References Cited

U.S. PATENT DOCUMENTS 9,454,154 B1 * 9/2016 Safarik ................ G05D 1/0088
9,830,572 B2   11/2017 Wan et al.
(Continued)

FOREIGN PATENT DOCUMENTS

CN       102756808 A    10/2012
CN       103803092 A     5/2014
(Continued)

OTHER PUBLICATIONS

International Search Report dated Oct. 13, 2017 in PCT/CN2017/091781, 2 pages.
(Continued)

*Primary Examiner* — Yuri Kan
(74) *Attorney, Agent, or Firm* — Oblon, McClelland, Maier & Neustadt, L.L.P.

(57) ABSTRACT

The present disclosure provides a method, a device and a system for guiding an unmanned aerial vehicle to land. A navigation equipment on the unmanned aerial vehicle sends a landing instruction to the ground, so that a landing platform receiving the landing instruction displays a landing pattern. The navigation equipment scans image of the ground to identify the landing pattern, and guides the unmanned aerial vehicle to land at the landing pattern and land on the landing platform eventually. The landing plat-
(Continued)

send a landing instruction to a landing platform, wherein the landing instruction comprises a pattern identifier, so that the landing platform displays a landing pattern corresponding to the pattern identifier — 101 identify the landing pattern corresponding to the pattern identifier — 102 guide the unmanned aerial vehicle to land at the landing pattern — 103 form displays a landing pattern according to the received instruction, and the unmanned aerial vehicle lands at the landing pattern, so that the unmanned aerial vehicle lands quickly and conveniently without extensive calculation.

7 Claims, 8 Drawing Sheets

(51) Int. Cl.
    *G06K 9/62*         (2022.01)
    *G06V 20/13*      (2022.01)
    *B64C 39/02*      (2006.01)
    *B64D 47/08*      (2006.01)
    *G05D 1/04*       (2006.01)

(52) U.S. Cl.
    CPC ........... *G05D 1/042* (2013.01); *G06K 9/6201* (2013.01); *G06K 9/6215* (2013.01); *G06V 20/13* (2022.01); *B64C 2201/141* (2013.01); *B64C 2201/18* (2013.01)

(58) Field of Classification Search
    CPC ...... G06Q 10/083; G05D 1/0088; G05D 1/00; B64D 45/04; B64D 47/02; B64D 47/08; F21S 8/00
    See application file for complete search history.

(56) References Cited

U.S. PATENT DOCUMENTS

| | | | |
|---|---|---|---|
| 10,078,808 B1* | 9/2018 | Sibon | G06Q 10/083 |
| 2007/0112478 A1 | 5/2007 | Notstrand et al. | |
| 2012/0293987 A1* | 11/2012 | Espedal | B64F 1/20 362/145 |
| 2014/0249745 A1 | 9/2014 | Brege et al. | |
| 2015/0367956 A1* | 12/2015 | Loussides | B64D 45/04 701/11 |
| 2016/0039542 A1* | 2/2016 | Wang | B64F 1/20 701/2 |
| 2017/0015438 A1* | 1/2017 | Harding | B64F 1/007 |
| 2017/0185084 A1* | 6/2017 | Wang | G05D 1/0088 |

FOREIGN PATENT DOCUMENTS

| | | |
|---|---|---|
| CN | 105000194 A | 10/2015 |
| CN | 105151309 A | 12/2015 |
| CN | 106143931 A | 11/2016 |
| GB | 2 302 318 A | 1/1997 |

OTHER PUBLICATIONS

Australian Office Action dated April 20, 2020 in Patent Application No. 2017306320, 5 pages.

* cited by examiner

METHOD, DEVICE AND SYSTEM FOR GUIDING UNMANNED AERIAL VEHICLE TO LAND

TECHNICAL FIELD

The present disclosure relates to the field of flight navigation, in particular to a method, a device and a system for guiding an unmanned aerial vehicle to land.

BACKGROUND

In the related art, the packages are distributed through unmanned aerial vehicles. In order to ensure that the unmanned aerial vehicle lands accurately, the current method is to identify a specific target on the ground by the unmanned aerial vehicle, calculate the position coordinates of the specific target in conjunction with a geometric positioning algorithm, and then guide the unmanned aerial vehicle to land according to the position coordinates.

SUMMARY

According to an aspect of the present disclosure, a method for guiding an unmanned aerial vehicle to land is provided, comprising: sending a landing instruction to a landing platform, so that the landing platform displays a landing pattern; identifying the landing pattern; and guiding the unmanned aerial vehicle to land at the landing pattern.

In some embodiments, sending a landing success information to the landing platform after the unmanned aerial vehicle lands on the landing platform, so that the landing platform cancels the display of the landing pattern.

In some embodiments, the landing instruction comprises a pattern identifier, so that the landing pattern displayed by the landing platform corresponds to the pattern identifier.

In some embodiments, the identifying the landing pattern comprises: scanning image of the ground to identify a matching pattern corresponding to the pattern identifier; and using the matching pattern as the landing pattern in the presence of only one matching pattern.

In some embodiments, the landing instruction is resent to the ground in the presence of a plurality of matching patterns, wherein the landing instruction comprises a reselected pattern identifier, so that the landing pattern displayed by the landing platform corresponds to the reselected pattern identifier.

In some embodiments, the sending a landing instruction to the landing platform comprises: sending the landing instruction to the landing platform after the unmanned aerial vehicle arrives at a designated area; or sending the landing instruction to the landing platform after receiving broadcast information sent by the landing platform.

According to another aspect of the present disclosure, a method for guiding an unmanned aerial vehicle to land is provided, comprising: receiving a landing instruction sent by a navigation equipment in the unmanned aerial vehicle; and displaying a landing pattern on a landing platform after receiving the landing instruction, so that the unmanned aerial vehicle lands at the landing pattern.

In some embodiments, canceling the display of the landing pattern after receiving a landing success information sent by the navigation equipment in the unmanned aerial vehicle.

In some embodiments, the displaying a landing pattern after receiving the landing instruction comprises: extracting a pattern identifier from the landing instruction after receiving the landing instruction; and displaying the landing pattern corresponding to the pattern identifier.

In some embodiments, the landing platform is a mobile platform.

According to still another aspect of the present disclosure, navigation equipment for guiding an unmanned aerial vehicle to land is provided, comprising: a sending unit configured to send a landing instruction to a landing platform, so that the landing platform displays a landing pattern; a image scanning unit, configured to identify the landing pattern; and a landing control unit, configured to guide the unmanned aerial vehicle to land at landing pattern.

In some embodiments, the landing control unit is further configured to instruct the sending unit to send a landing success information to the landing platform after the unmanned aerial vehicle lands on the landing platform, so that the landing platform cancels the display of the landing pattern.

In some embodiments, the landing instruction comprises a pattern identifier, so that the landing pattern displayed by the landing platform corresponds to the pattern identifier.

In some embodiments, the image scanning unit is configured to scan image of the ground to identify a matching pattern corresponding to the pattern identifier, and use the matching pattern as the landing pattern in the presence of only one matching pattern.

In some embodiments, the image scanning unit is further configured to instruct the sending unit to resend the landing instruction to the ground in the presence of a plurality of matching patterns, wherein the landing instruction comprises a reselected pattern identifier, so that the landing pattern displayed by the landing platform corresponds to the reselected pattern identifier.

In some embodiments, the navigation equipment further comprising: a area identification unit, configured to identify an area where the unmanned aerial vehicle is currently located; and the landing control unit configured to send the landing instruction to the ground after the area identification unit determines that the unmanned aerial vehicle arrives at the designated area.

In some embodiments, the navigation equipment further comprising: a receiving unit, configured to receive broadcast information sent by the landing platform; and the landing control unit configured to send the landing instruction to the ground after the receiving unit receives the broadcast information sent by the landing platform.

According to still another aspect of the present disclosure, navigation equipment for guiding an unmanned aerial vehicle to land is provided, comprising: a memory, configured to store instructions; and a processor, coupled to the memory, and the processor is configured to perform the method according to any of the above embodiments based on the instructions stored in the memory.

According to still another aspect of the present disclosure, an unmanned aerial vehicle is provided, comprising the navigation equipment of any of the above embodiments.

According to still another aspect of the present disclosure, a landing platform for guiding an unmanned aerial vehicle to land is provided, comprising: a receiving module, configured to receive a landing instruction sent by a navigation equipment in the unmanned aerial vehicle; and a display control module, configured to display a landing pattern on a display module after the receiving module receives the landing instruction, so that the unmanned aerial vehicle lands at the landing pattern.

In some embodiments, the display control module is further configured to cancel the display of the landing pattern after the receiving module receives a landing success information sent by the navigation equipment in the unmanned aerial vehicle.

In some embodiments, the display control module is configured to extract a pattern identifier from the landing instruction after the receiving module receives the landing instruction, and display the landing pattern corresponding to the pattern identifier on the display module.

In some embodiments, the landing platform is a mobile platform.

According to still another aspect of the present disclosure, a landing platform for guiding an unmanned aerial vehicle to land is provided, comprising: a memory, configured to store instructions; and a processor, coupled to the memory, and the processor is configured to perform the method according to any of the above embodiments based on the instructions stored in the memory.

According to still another aspect of the present disclosure, an unmanned aerial vehicle navigation system is provided, comprising the unmanned aerial vehicle according to any of the above embodiments, and the landing platform according to any of the above embodiments.

According to still another aspect of the present disclosure, a computer non-transitory readable storage medium storing a computer program is provided, when being executed by a processor, the computer program implements the method according to any one of the above embodiments.

Other features of the present disclosure and the advantages thereof will become apparent through the following detailed description of exemplary embodiments of the present disclosure with reference to the accompanying drawings.

BRIEF DESCRIPTION OF THE DRAWINGS

The accompanying drawings described here are used for providing a further understanding on the present disclosure, and constitute a part of the present application. The schematic embodiments of the present disclosure and the description thereof are used for interpreting the present disclosure, rather than constituting improper limitations to the present disclosure. In the drawings.

EMBODIMENTS

The present disclosure will be further described below in detail with reference to the accompanying drawings and embodiments.

In the related art, during the unmanned aerial vehicle is guided to land, a large amount of calculation is required, which increases the processing burden and cost of the unmanned aerial vehicle, and also reduces the landing control efficiency of the unmanned aerial vehicle.

The present disclosure provides a method, a device and a system for guiding an unmanned aerial vehicle to land, wherein a landing platform displays a corresponding landing pattern according to an instruction of the unmanned aerial vehicle, and the unmanned aerial vehicle lands by scanning the landing pattern, so that the unmanned aerial vehicle lands quickly and conveniently without extensive calculation.

Figure 1:
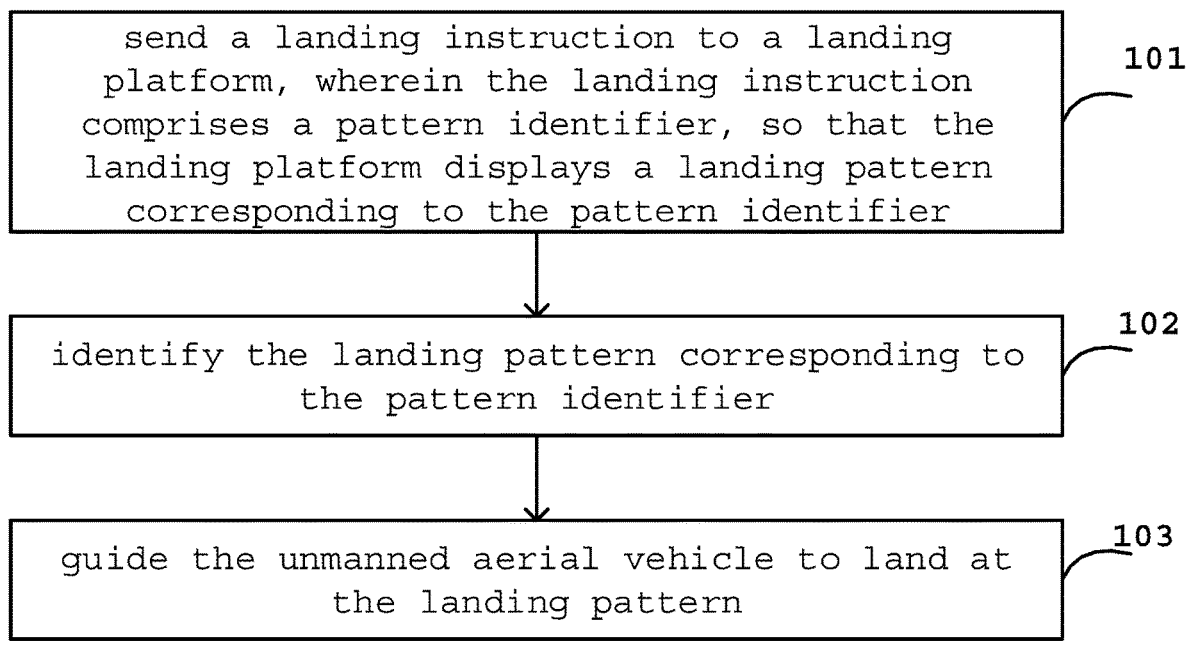
FIG. 1 is a schematic diagram of an embodiment of a method for guiding an unmanned aerial vehicle to land according to the present disclosure.

FIG. 1 is a schematic diagram of an embodiment of a method for guiding an unmanned aerial vehicle to land according to the present disclosure. In some embodiments, the steps of the embodiment can be performed by navigation equipment configured in the unmanned aerial vehicle.

In step 101, a landing instruction is sent to the ground, so that a landing platform receiving the landing instruction displays a landing pattern.

In some embodiments, after the unmanned aerial vehicle arrives at a designated area, the navigation equipment sends a landing instruction directly to the ground. Alternatively, in order to establish a contact between the landing platform and the unmanned aerial vehicle, the landing platform sends broadcast information to the outside continuously. When the navigation equipment of the unmanned aerial vehicle receives the broadcast information, it can be determined that the landing platform is at a certain position in the nearby area. Then, the navigation equipment sends the landing instruction to the ground.

In step 102, image of the ground is scanned to identify a landing pattern.

In some embodiments, the landing instruction includes a pattern identifier, so that the landing pattern displayed by the landing platform corresponds to the pattern identifier. Thus, the pattern corresponding to the pattern identifier is used as a landing pattern by image scanning and image identification.

In step 103, the unmanned aerial vehicle is guided to land at the landing pattern and landed on the landing platform eventually.

In some embodiments, after the unmanned aerial vehicle lands on the landing platform, the unmanned aerial vehicle sends a landing success information to the landing platform, so that the landing platform cancels the display of the landing pattern.

Based on the method for guiding an unmanned aerial vehicle to land according to the above embodiment of the present disclosure, a landing instruction is sent to the landing platform, the landing platform displays a corresponding landing pattern according to the instruction, and the unmanned aerial vehicle lands at the landing pattern, so that the unmanned aerial vehicle lands quickly and conveniently without extensive calculation.

Figure 2:
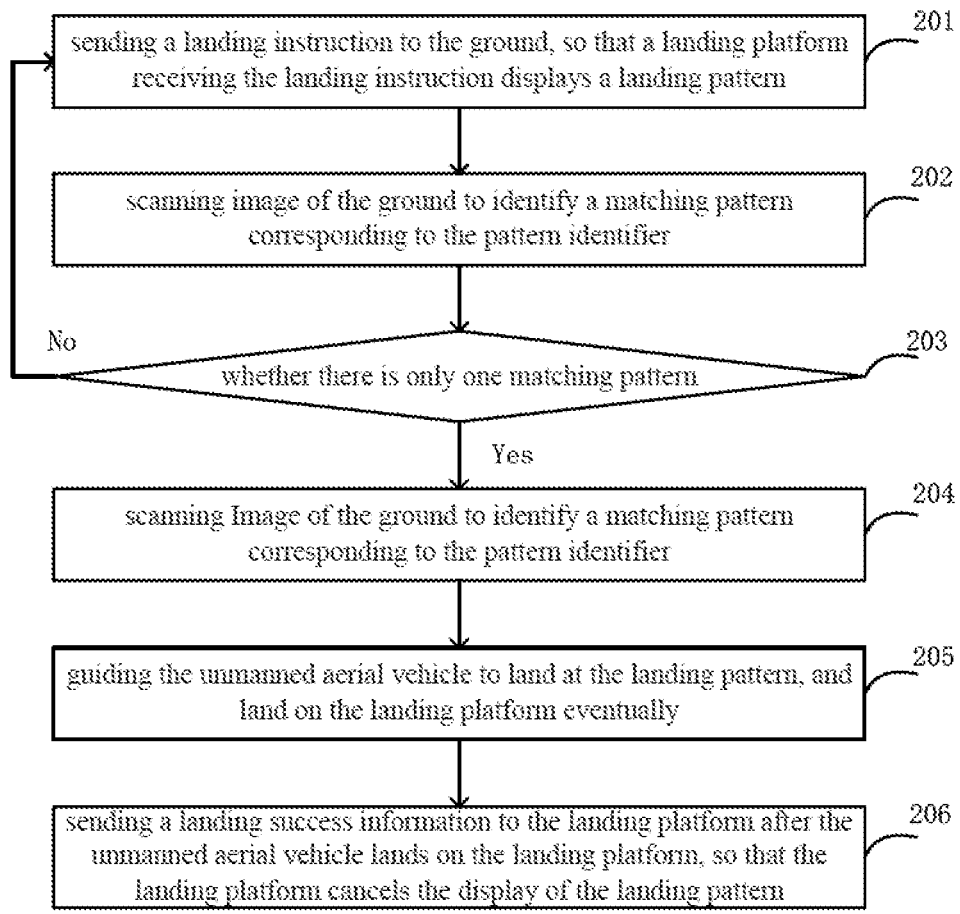
FIG. 2 is a schematic diagram of another embodiment of a method for guiding an unmanned aerial vehicle to land according to the present disclosure.

FIG. 2 is a schematic diagram of another embodiment of a method for guiding an unmanned aerial vehicle to land according to the present disclosure. In some embodiments, the steps of the embodiment can be performed by navigation equipment configured in the unmanned aerial vehicle.

In step 201, a landing instruction is sent to the ground, so that a landing platform receiving the landing instruction displays a landing pattern.

The landing instruction includes a pattern identifier, so that the landing pattern displayed by the landing platform corresponds to the pattern identifier.

In step 202, image of the ground is scanned to identify a matching pattern corresponding to the pattern identifier.

In step 203, whether there is only one matching pattern is judged. If there is only one matching pattern, step 204 is executed; if there are a plurality of matching patterns, step 201 is executed again, wherein the landing instruction includes a reselected pattern identifier, so that the landing pattern displayed by the landing platform corresponds to the reselected pattern identifier.

In step 204, the matching pattern is used as a landing pattern.

In step 205, the unmanned aerial vehicle is guided to land at the landing pattern and landed on the landing platform eventually.

In step 206, a landing success information is sent to the landing platform after the unmanned aerial vehicle lands on the landing platform, so that the landing platform cancels the display of the landing pattern.

The following situation may occur during the landing of the unmanned aerial vehicle. The landing instruction sent by the navigation equipment to the ground carries a No. 1 pattern identifier. The landing platform displays a group of concentric circles as the landing pattern according to the No. 1 pattern identifier after receiving the landing instruction. If landscape lamps on a nearby building are turned on, a group of concentric circles similar to the landing pattern is just formed from the top view. When the navigation equipment scans image of the ground and performs image identification, it finds two matching images corresponding to the No. 1 pattern identifier, so the navigation equipment cannot distinguish, only through the images, which landing image is displayed on the landing platform and which image is formed by the landscape lamps on the building.

In order to avoid this problem, the present disclosure proposes that after the above situation occurs, a landing instruction, which carries a No. 2 pattern identifier, can be sent again to the ground. After receiving the landing instruction, the landing platform displays a group of diamonds as the landing pattern according to the No. 2 pattern identifier, so that the navigation equipment can land at the diamond pattern. Through the above processing, the interference of the outside to the identification of the navigation equipment on the landing pattern can be effectively avoided.

In the above embodiments, the navigation equipment on the unmanned aerial vehicle sends the landing instruction to the landing platform with infrared or in other wireless manners.

Figure 3:
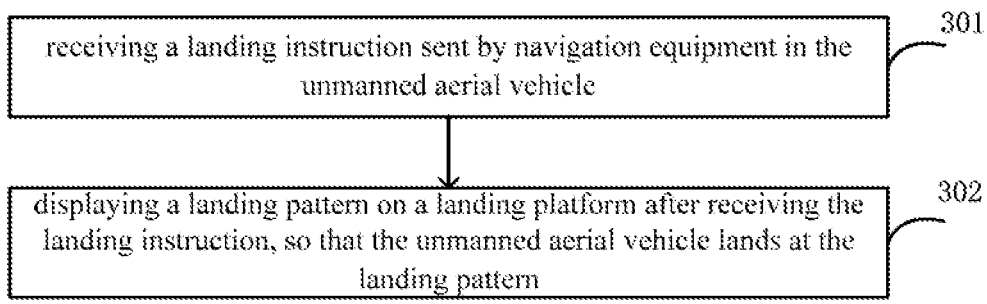
FIG. 3 is a schematic diagram of still another embodiment of a method for guiding an unmanned aerial vehicle to land according to the present disclosure.

FIG. 3 is a schematic diagram of still another embodiment of a method for guiding an unmanned aerial vehicle to land according to the present disclosure. In some embodiments, the steps of this embodiment can be performed by a landing platform.

In step 301, a landing instruction sent by a navigation equipment in the unmanned aerial vehicle is received.

In step 302, a landing pattern is displayed on the landing platform after the landing instruction is received, so that the unmanned aerial vehicle lands at the landing pattern.

In some embodiments, a pattern identifier can be extracted from the landing instruction after the landing instruction is received, and then a landing pattern corresponding to the pattern identifier is displayed.

In addition, the display of the landing pattern can be canceled after the landing success information sent by the navigation equipment in the unmanned aerial vehicle is received.

In some embodiments, the landing platform is fixed to the ground or a mobile platform. For example, the landing platform is an unmanned vehicle, a towed vehicle, etc. After the unmanned aerial vehicle lands on the landing platform, the landing platform delivers directly articles to a target warehouse, recipients, etc., thereby saving related operations for staffs to load the articles transported by the unmanned aerial vehicle.

Figure 4:
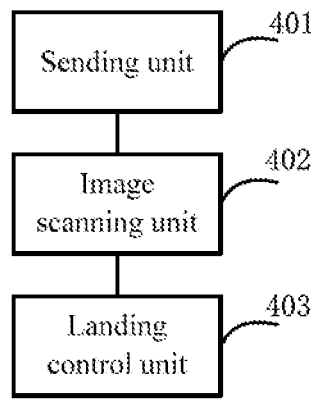
FIG. 4 is a schematic diagram of an embodiment of navigation equipment for guiding an unmanned aerial vehicle to land according to the present disclosure.

FIG. 4 is a schematic diagram of an embodiment of navigation equipment for guiding an unmanned aerial vehicle to land according to the present disclosure. As shown in FIG. 4, the navigation equipment includes a sending unit 401, an image scanning unit 402 and a landing control unit 403.

The sending unit 401 sends a landing instruction to the ground, so that a landing platform receiving the landing instruction displays a landing pattern.

In some embodiments, the landing instruction includes a pattern identifier, so that the landing pattern displayed by the landing platform corresponds to the pattern identifier.

The image scanning unit 402 scans image of the ground to identify the landing pattern.

The landing control unit 403 guides the unmanned aerial vehicle to land at the landing pattern and land on the landing platform eventually.

In some embodiments, the landing control unit 403 is configured to instruct, after the unmanned aerial vehicle lands on the landing platform, the sending unit 401 to send a landing success information to the landing platform, so that the landing platform cancels the display of the landing pattern.

Based on the navigation equipment for guiding an unmanned aerial vehicle to land according to the above embodiment of the present disclosure, a landing instruction is sent to the landing platform, the landing platform displays a corresponding landing pattern according to the instruction, and the unmanned aerial vehicle lands at the landing pattern, so that the unmanned aerial vehicle lands quickly and conveniently without extensive calculation.

In some embodiments, the image scanning unit 402 scans image of the ground to identify a matching pattern corresponding to the pattern identifier. In the presence of only one matching pattern, the matching pattern is used as the landing pattern. In the presence of a plurality of matching patterns, the sending unit 401 is instructed to resend a landing instruction to the ground, wherein the landing instruction includes a reselected pattern identifier, so that the landing pattern displayed by the landing platform corresponds to the reselected pattern identifier.

That is, if a plurality of matching patterns corresponding to the pattern identifier are found in image scanning and image identification, the navigation equipment resends a landing instruction to the landing platform to instruct the landing platform to display the corresponding landing pattern according to the reselected pattern identifier, thereby avoiding effectively the influence of the outside on determining the landing pattern.

Figure 5:
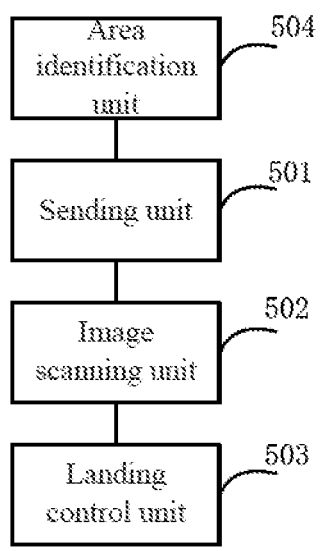
FIG. 5 is a schematic diagram of another embodiment of navigation equipment for guiding an unmanned aerial vehicle to land according to the present disclosure.

In some embodiments, the navigation equipment sends a landing instruction to the ground in a different manner. For example, in the schematic diagram of the navigation equipment for guiding the unmanned aerial vehicle to land as shown in FIG. 5, the navigation equipment further includes an area identification unit 504 besides the sending unit 501, the image scanning unit 502 and the landing control unit 503.

The area identification unit 504 is configured to identify an area where the unmanned aerial vehicle is currently located. The landing control unit 503 sends a landing instruction to the ground after the area identification unit 504 determines that the unmanned aerial vehicle arrives at the designated area.

Figure 6:
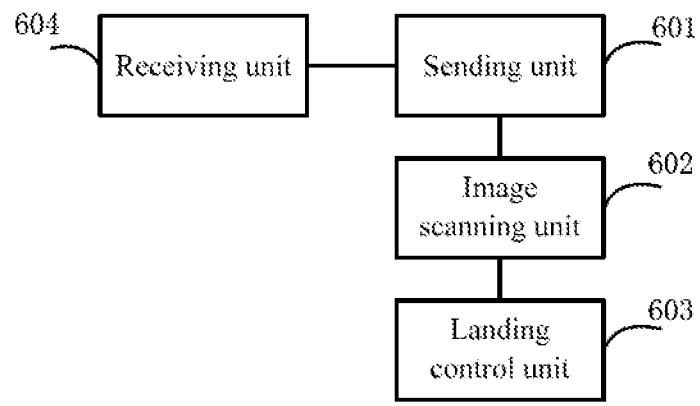
FIG. 6 is a schematic diagram of still another embodiment of navigation equipment for guiding an unmanned aerial vehicle to land according to the present disclosure.

Moreover, in the schematic diagram of the navigation equipment for guiding the unmanned aerial vehicle to land as shown in FIG. 6, the navigation equipment further includes a receiving unit 604 besides the sending unit 601, the image scanning unit 602 and the landing control unit 603.

The receiving unit 604 is configured to receive broadcast information sent by the landing platform. The landing control unit 603 is configured to send a landing instruction to the ground after the receiving unit 604 receives the broadcast information sent by the landing platform.

Figure 7:
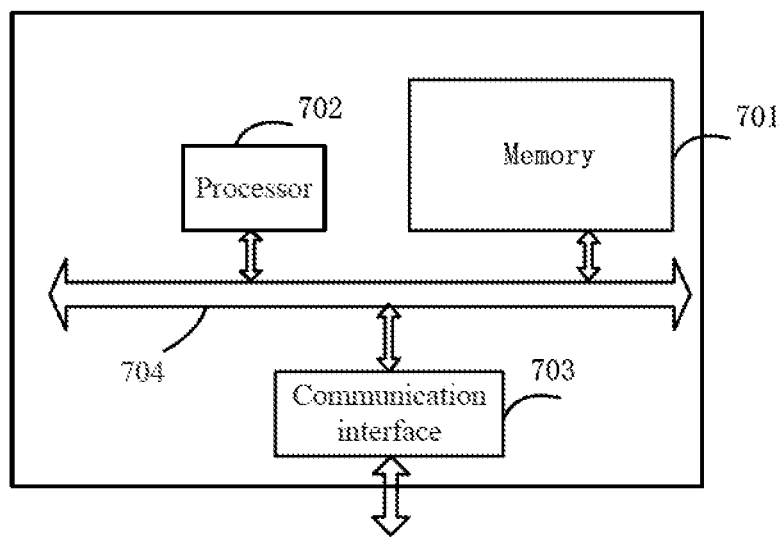
FIG. 7 is a schematic diagram of still another embodiment of navigation equipment for guiding an unmanned aerial vehicle to land according to the present disclosure.

FIG. 7 is a schematic diagram of still another embodiment of navigation equipment for guiding an unmanned aerial vehicle to land according to the present disclosure. As shown in FIG. 7, the navigation equipment includes a memory 701 and a processor 702.

The memory 701 is configured to store instructions. The processor 702 is coupled to the memory 701, and the processor 702 is configured to perform the method according to any of the embodiments of FIG. 1 and FIG. 2 based on the instructions stored in the memory 701.

In addition, the navigation equipment further includes a communication interface 703 for information interaction with other equipment. The equipment further includes a bus 704. The processor 702, the communication interface 703 and the memory 701 communicate with each other through the communication bus 704.

Figure 8:
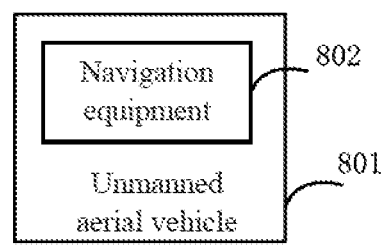
FIG. 8 is a schematic diagram of an embodiment of an unmanned aerial vehicle according to the present disclosure.

As shown in FIG. 8, the present disclosure further relates to an unmanned aerial vehicle 801 in which navigation equipment 802 is provided. The navigation equipment 802 is the navigation equipment shown in any of the embodiments of FIG. 4 to FIG. 7.

Figure 9:
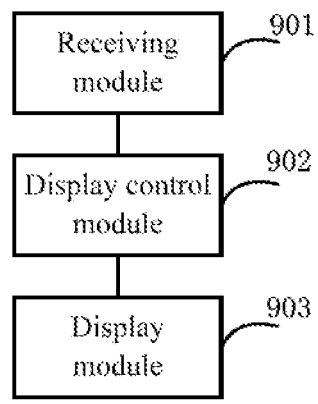
FIG. 9 is a schematic diagram of an embodiment of a landing platform for guiding an unmanned aerial vehicle to land according to the present disclosure.

FIG. 9 is a schematic diagram of an embodiment of a landing platform for guiding an unmanned aerial vehicle to land according to the present disclosure. As shown in FIG. 9, the landing platform includes a receiving module 901, a display control module 902 and a display module 903.

The receiving module 901 is configured to receive a landing instruction sent by navigation equipment in the unmanned aerial vehicle. After the receiving module 901 receives the landing instruction, the display control module 902 displays a landing pattern on the display module 903, so that the unmanned aerial vehicle lands at the landing pattern.

In some embodiments, the display control module 902 is configured to extract a pattern identifier from the landing instruction after the receiving module 901 receives the landing instruction. The display module 903 displays the landing pattern corresponding to the pattern identifier.

In some embodiments, the display control module 902 is configured to cancel the display of the landing pattern after the receiving module 901 receives a landing success information sent by the navigation equipment in the unmanned aerial vehicle.

In addition, the landing platform is fixed to the ground or a mobile platform. For example, the landing platform is an unmanned vehicle, a towed vehicle, etc. After the unmanned aerial vehicle lands on the landing platform, the landing platform delivers directly articles to a target warehouse, recipients, etc., thereby saving related operations for staffs to load the articles transported by the unmanned aerial vehicle.

Figure 10:
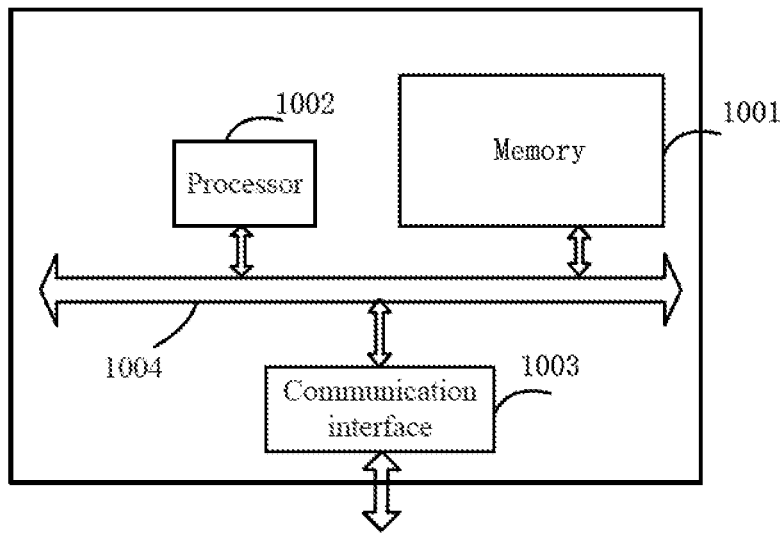
FIG. 10 is a schematic diagram of another embodiment of a landing platform for guiding an unmanned aerial vehicle to land according to the present disclosure.

FIG. 10 is a schematic diagram of another embodiment of a landing platform for guiding an unmanned aerial vehicle to land according to the present disclosure. As shown in FIG. 10, the landing platform includes a memory 1001 and a processor 1002.

The memory 1001 is configured to store instructions. The processor 1002 is coupled to the memory 1001, and the processor 1002 is configured to perform the method according to any of the embodiments of FIG. 3 based on the instructions stored in the memory 1001.

In addition, the landing platform further includes a communication interface 1003 for information interaction with other equipment. The equipment further includes a bus 1004. The processor 1002, the communication interface 1003 and the memory 1001 communicate with each other through the communication bus 1004.

The memory 701 in FIG. 7 and the memory 1001 in FIG. 10 may include a high-speed random access memory (RAM), or a non-volatile memory, e.g., at least one magnetic disc memory. The memory 701 and the memory 1001 may also be memory arrays. The memory 701 and the memory 1001 may also be blocks, and the blocks are combined into a virtual volume according to certain rule.

The processor 702 in FIG. 7 and the processor 1002 in FIG. 10 may be a central processing unit (CPU), or an application specific integrated circuit (ASIC), or one or more integrated circuits configured to implement the embodiments of the present application.

Figure 11:
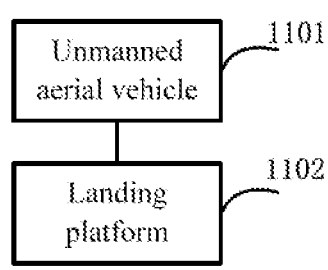
FIG. 11 is a schematic diagram of an embodiment of an unmanned aerial vehicle navigation system according to the present disclosure.

FIG. 11 is a schematic diagram of an embodiment of an unmanned aerial vehicle navigation system according to the present disclosure. As shown in FIG. 11, the system includes an unmanned aerial vehicle 1101 and a landing platform 1102. The unmanned aerial vehicle 1101 is the unmanned aerial vehicle according to any of the embodiments of FIG. 8. The landing platform 1102 is the landing platform according to any of the embodiments of FIG. 9 and FIG. 10.

Based on the unmanned aerial vehicle navigation system according to the above embodiment of the present disclosure, the unmanned aerial vehicle sends a landing instruction to the landing platform, the landing platform displays a corresponding landing pattern according to the instruction, and the unmanned aerial vehicle lands at the landing pattern, so that the unmanned aerial vehicle lands quickly and conveniently without extensive calculation.

The present disclosure will be described below through specific examples.

Figure 12:
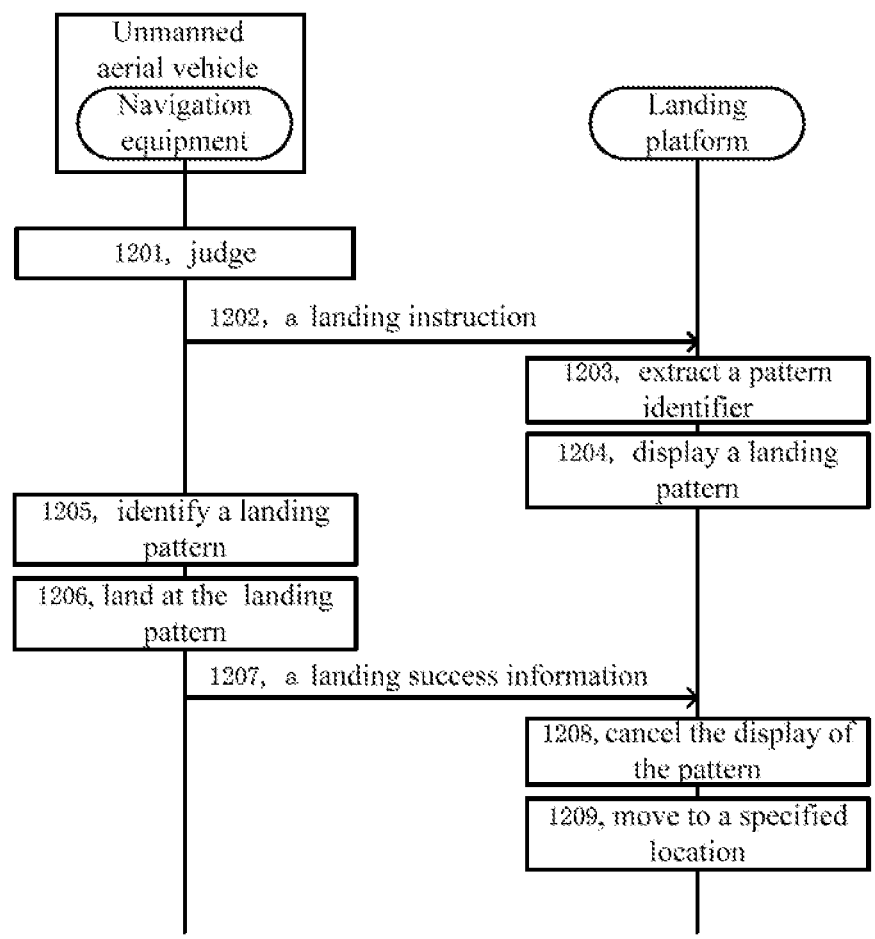
FIG. 12 is a schematic diagram of an embodiment of unmanned aerial vehicle navigation control according to the present disclosure.

FIG. 12 is a schematic diagram of an embodiment of unmanned aerial vehicle navigation control according to the present disclosure. In the present embodiment, after the unmanned aerial vehicle arrives at a designated area, the navigation equipment on the unmanned aerial vehicle sends a landing instruction to the ground.

In step 1201, during the flight of the unmanned aerial vehicle, the navigation equipment on the unmanned aerial vehicle determines an area where the unmanned aerial vehicle is currently located.

In step 1202, after the unmanned aerial vehicle arrives at the designated area, the navigation equipment sends a landing instruction to the ground.

In step 1203, after receiving the landing instruction, the mobile landing platform extracts a pattern identifier from the landing instruction.

In step 1204, the landing platform displays a landing pattern corresponding to the pattern identifier.

In step 1205, the navigation equipment scans image of the ground to identify the landing pattern.

In step 1206, the navigation equipment guides the unmanned aerial vehicle to land at the landing pattern.

In step 1207, after the unmanned aerial vehicle lands successfully on the landing platform, the navigation equipment sends a landing success information to the landing platform.

In step 1208, the landing platform cancels the display of the landing pattern after receiving the landing success information.

In step 1209, the landing platform arrives at the designated location by means of self-movement, traction or the like.

Figure 13:
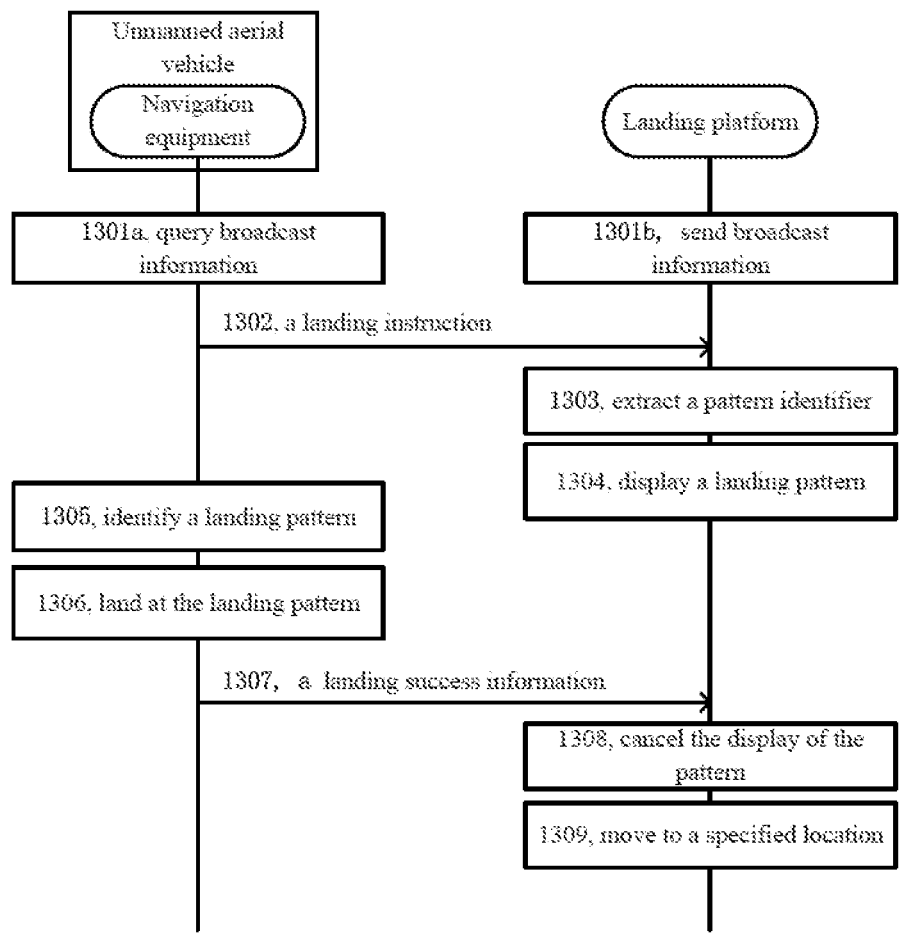
FIG. 13 is a schematic diagram of another embodiment of unmanned aerial vehicle navigation control according to the present disclosure.

FIG. 13 is a schematic diagram of another embodiment of unmanned aerial vehicle navigation control according to the present disclosure. The landing platform sends continuously broadcast information to the outside, so that the unmanned aerial vehicle receiving the broadcast information sends a landing instruction to the ground.

In step 1301*a*, during the flight of the unmanned aerial vehicle, the navigation equipment on the unmanned aerial vehicle judges whether the broadcast information sent by the mobile landing platform is received. Correspondingly, in step 1301*b*, the landing platform sends continuously broadcast information to the outside.

In step 1302, if the navigation equipment on the unmanned aerial vehicle receives the broadcast information, it indicates that the unmanned aerial vehicle is close to the area where the landing platform is located, and the navigation equipment sends a landing instruction to the ground. In step 1303, after receiving the landing instruction, the landing platform extracts a pattern identifier from the landing instruction.

In step 1304, the landing platform displays a landing pattern corresponding to the pattern identifier.

In step 1305, the navigation equipment scans image of the ground to identify the landing pattern.

In step 1306, the navigation equipment guides the unmanned aerial vehicle to land at the landing pattern.

In step 1307, after the unmanned aerial vehicle lands successfully on the landing platform, the navigation equipment sends a landing success information to the landing platform.

In step 1308, the landing platform cancels the display of the landing pattern after receiving the landing success information.

In step 1309, the landing platform arrives at the designated location by means of self-movement, traction or the like.

By implementing the present disclosure, the following beneficial effects can be obtained:

1) The unmanned aerial vehicle sends a landing instruction to the landing platform, the landing platform displays a corresponding landing pattern according to the instruction. The unmanned aerial vehicle lands at the landing pattern, so that the unmanned aerial vehicle lands quickly and conveniently without extensive calculation. Therefore, the computational processing pressure of the unmanned aerial vehicle is greatly relieved, and the hardware configuration requirements of the unmanned aerial vehicle are lowered.

2) The landing platform is a mobile platform, and can deliver directly articles thereon to a target warehouse, recipients, etc., thereby saving related operations for staffs to carry and load the articles transported by the unmanned aerial vehicle, thus effectively reducing manual intervention, and significantly reducing the delivery costs of the articles.

3) The landing platform displays a corresponding landing pattern according to the landing instruction sent by the unmanned aerial vehicle, so the landing pattern can be changed dynamically according to the instruction to effectively prevent the displayed landing pattern from being confused with other illuminants or images in the same area.

A person skilled in the art should understand that the embodiments of the present disclosure may be provided as a method, a system, or a computer program product. Therefore, the present disclosure may use a form of a full hardware embodiment, a full software embodiment, or an embodiment combining software and hardware. In addition, the present disclosure may use a form of a computer program product implemented on one or more computer available non-instantaneous storage media (including but not limited to a disk memory, a CD-ROM, an optical memory, and the like) including computer available program codes.

The present disclosure is described with reference to flow diagrams and/or block diagrams of the method, equipment (system), and the computer program product in the embodiments of the present disclosure. It should be understood that computer program instructions can implement each process and/or block in the flow diagrams and/or block diagrams and a combination of processes and/or blocks in the flow diagrams and/or block diagrams. These computer program instructions may be provided to a general-purpose computer, a dedicated computer, an embedded processor, or a processor of other programmable data processing equipment to generate a machine, so that a device configured to implement functions specified in one or more processes in the flow diagrams and/or one or more blocks in the block diagrams is generated by using instructions executed by the general-purpose computer or the processor of other programmable data processing equipment.

These computer program instructions may also be stored in a computer readable memory that can guide a computer or other programmable data processing equipment to work in a specific manner, so that the instructions stored in the computer readable memory generate a product including an instruction device, where the instruction device implements functions specified in one or more processes in the flow diagrams and/or one or more blocks in the block diagrams.

These computer program instructions may also be loaded into a computer or other programmable data processing equipment, so that a series of operation steps are performed on the computer or other programmable data processing equipment to generate processing implemented by a computer, and instructions executed on the computer or other programmable data processing equipment provides steps for implementing functions specified in one or more processes in the flow diagrams and/or one or more blocks in the block diagrams.

The description of the present disclosure has been presented for the purposes of illustration and description, and is not exhaustive, nor limits the present disclosure to the forms disclosed. Many modifications and variations would be apparent to those of ordinary skill in the art. The embodiments are chosen and described in order to illustrate the principle and practical application of the present disclosure better, and various embodiments with various modifications suitable for specific purposes are designed so that those of ordinary skill in the art can understand the present disclosure.

The invention claimed is:

1. A method for guiding an unmanned aerial vehicle to land, comprising:

sending, by a navigation equipment of the unmanned aerial vehicle, a landing instruction to a landing platform, wherein the landing instruction comprises a pattern identifier, so that the landing platform displays one landing pattern corresponding to the pattern identifier;

identifying, by the navigation equipment of the unmanned aerial vehicle, the landing pattern corresponding to the pattern identifier, comprising scanning, by the navigation equipment of the unmanned aerial vehicle, an image of the landing platform to identify one or more matching patterns corresponding to the pattern identifier, determining, by the navigation equipment of the unmanned aerial vehicle, if there is only one matching pattern or if there is a plurality of matching patterns corresponding to the pattern identifier in the image of the landing platform, using, by the navigation equipment of the unmanned aerial vehicle, the matching pattern as the landing pattern when it is determined that there is only one matching pattern, and resending, by the navigation equipment of the unmanned aerial vehicle, the landing instruction to the landing platform when it is determined that there is a plurality of matching patterns, wherein the landing instruction comprises a reselected pattern identifier, so that the landing platform displays one landing pattern corresponding to the reselected pattern identifier, and the landing pattern displayed on the landing platform is adjusted by the navigation equipment according to an environment around the landing platform, thereby preventing the landing pattern from being disturbed by the environment, and helping the unmanned aerial vehicle land on the landing platform; and guiding, by the navigation equipment of the unmanned aerial vehicle, the unmanned aerial vehicle to land at the landing pattern.

2. The method according to claim 1, further comprising:

sending, by the navigation equipment of the unmanned aerial vehicle, a landing confirmation information to the landing platform after the unmanned aerial vehicle lands on the landing platform, so that the landing platform cancels the display of the landing pattern.

3. The method according to claim 1, wherein the sending a landing instruction to the landing platform comprises:

sending, by the navigation equipment of the unmanned aerial vehicle, the landing instruction to the landing platform after the unmanned aerial vehicle arrives at a designated area; or, sending, by the navigation equipment of the unmanned aerial vehicle, the landing instruction to the landing platform after receiving information sent by the landing platform.

4. A navigation equipment for guiding an unmanned aerial vehicle to land, comprising:

a memory, configured to store instructions; and a processor, coupled to the memory, and the processor is configured to perform the method according to claim 1 based on the instructions stored in the memory.

5. An unmanned aerial vehicle, comprising the navigation equipment according to claim 4.

6. An unmanned aerial vehicle navigation system, comprising:

the unmanned aerial vehicle according to claim 5, and a landing platform comprising a memory, configured to store instructions; and a processor, coupled to the memory, and the processor is configured to perform the following steps based on the instructions stored in the memory:

receiving a landing instruction sent by a navigation equipment of the unmanned aerial vehicle;

extracting a pattern identifier from the landing instruction after receiving the landing instruction; and displaying one landing pattern corresponding to the pattern identifier on a landing platform, so that the unmanned aerial vehicle lands at the landing pattern.

7. A computer non-transitory readable storage medium storing a computer program that, when being executed by a processor, implements the method according to claim 1.

* * * * *